(12) United States Patent
Rispoli et al.

(10) Patent No.: US 12,042,728 B2
(45) Date of Patent: *Jul. 23, 2024

(54) GAME MOMENT IMPLEMENTATION SYSTEM AND METHOD OF USE THEREOF

(71) Applicant: ONMOBILE GLOBAL SOLUTIONS CANADA LIMITED, Montréal (CA)

(72) Inventors: Richard Rispoli, Montréal (CA); Ivano Mansueto, Ste-Catherine (CA); Henrik Lewander, Torslanda (SE); Julien Duranton, Montréal (CA)

(*) Notice: Subject to any disclaimer, the term of this patent is extended or adjusted under 35 U.S.C. 154(b) by 0 days.

This patent is subject to a terminal disclaimer.

(21) Appl. No.: 18/173,890

(22) Filed: Feb. 24, 2023

(65) Prior Publication Data
US 2023/0277929 A1 Sep. 7, 2023

Related U.S. Application Data

(63) Continuation of application No. 17/879,017, filed on Aug. 2, 2022, now Pat. No. 11,623,146, which is a continuation of application No. PCT/CA2021/051549, filed on Nov. 2, 2021.

(60) Provisional application No. 63/110,195, filed on Nov. 5, 2020, provisional application No. 63/217,147, filed on Jun. 30, 2021.

(51) Int. Cl.
*A63F 13/52* (2014.01)

(52) U.S. Cl.
CPC .................................. *A63F 13/52* (2014.09)

(58) Field of Classification Search
CPC ............ A63F 13/49; A63F 13/52; A63F 13/53
See application file for complete search history.

(56) References Cited

U.S. PATENT DOCUMENTS

| 6,699,127 | B1 | 3/2004 | Lobb et al. |
| 8,444,490 | B2 | 5/2013 | Youm |
| 8,515,253 | B2 | 8/2013 | Cottrell |
| 8,874,661 | B2 | 10/2014 | Wild et al. |
| 9,248,374 | B2 | 2/2016 | Watson et al. |
| 9,526,995 | B2 | 12/2016 | Brunstetter et al. |

(Continued)

FOREIGN PATENT DOCUMENTS

GB 2579603 A 7/2020

OTHER PUBLICATIONS

International application No. PCT/CA2021/051549 International Search Report dated Mar. 1, 2022.

(Continued)

*Primary Examiner* — Chase E Leichliter
(74) *Attorney, Agent, or Firm* — Anglehart et al.

(57) ABSTRACT

A method for implementing a moment of a videogame for playing a portion of a videogame; it includes receiving user selection input of a moment of a particular videogame associated with starting at a particular progress point of the particular videogame; causing an emulation to start of the particular videogame for streaming on the computer of the user; performing image analysis of the image stream to generate metadata on progress of the particular game by the user; determining if one or more end conditions of the moment is met through analysis of the metadata; and causing the emulation to end, resulting in an end of the streaming of the particular game on the computer of the user, if the one or more end conditions is met.

20 Claims, 9 Drawing Sheets

(56) References Cited

U.S. PATENT DOCUMENTS

| | | |
|---|---|---|
| 9,623,331 B2 | 4/2017 | Kim |
| 9,782,678 B2 | 10/2017 | Long et al. |
| 10,092,833 B2 | 10/2018 | George |
| 10,272,336 B2 | 4/2019 | Chimes et al. |
| 10,632,374 B2 | 4/2020 | Nomura et al. |
| 11,154,773 B2 | 10/2021 | White et al. |
| 11,565,176 B2 * | 1/2023 | Perry ............ A63F 13/63 |
| 11,623,146 B2 * | 4/2023 | Rispoli ........ H04N 21/472 463/31 |
| 2007/0021216 A1 | 1/2007 | Guruparan |
| 2007/0117617 A1 | 5/2007 | Spanton et al. |
| 2008/0045335 A1 | 2/2008 | GarbOw et al. |
| 2008/0096663 A1 | 4/2008 | Lieberman et al. |
| 2008/0268961 A1 | 10/2008 | Brook et al. |
| 2009/0118016 A1 | 5/2009 | Ben-Artzi et al. |
| 2011/0151971 A1 | 6/2011 | Altshuler et al. |
| 2011/0319170 A1 * | 12/2011 | Shimura ............ A63F 13/63 463/42 |
| 2012/0100910 A1 | 4/2012 | Eichorn et al. |
| 2014/0004957 A1 * | 1/2014 | Stine ............ A63F 13/49 463/42 |
| 2014/0179427 A1 * | 6/2014 | Miura ............ A63F 13/69 463/31 |
| 2014/0179439 A1 * | 6/2014 | Miura ............ A63F 13/53 463/42 |
| 2014/0187318 A1 * | 7/2014 | Gallizzi ............ A63F 13/355 463/31 |
| 2014/0187323 A1 * | 7/2014 | Perry ............ A63F 13/21 463/31 |
| 2015/0105154 A1 | 4/2015 | Green et al. |
| 2015/0375102 A1 | 12/2015 | George |
| 2016/0317933 A1 | 11/2016 | Shoshan |
| 2017/0001111 A1 | 1/2017 | Willette et al. |
| 2017/0228600 A1 * | 8/2017 | Syed ............ G06V 20/62 |
| 2017/0246544 A1 | 8/2017 | Agarwal et al. |
| 2017/0319956 A1 | 11/2017 | Vandonkelaar |
| 2018/0021684 A1 * | 1/2018 | Benedetto ............ A63F 13/63 463/24 |
| 2018/0161675 A1 | 6/2018 | Miron et al. |
| 2019/0270008 A1 | 9/2019 | Zhang et al. |
| 2019/0270019 A1 * | 9/2019 | Miura ............ H04N 21/4781 |
| 2019/0270020 A1 * | 9/2019 | Miura ............ A63F 13/35 |
| 2019/0291010 A1 | 9/2019 | Benedetto et al. |
| 2020/0147489 A1 | 5/2020 | Mahlmeister et al. |
| 2020/0175947 A1 | 6/2020 | Benedetto et al. |
| 2020/0197821 A1 | 6/2020 | Benedetto |
| 2020/0206625 A1 * | 7/2020 | Perry ............ A63F 13/79 |
| 2020/0206628 A1 | 7/2020 | Benedetto et al. |
| 2021/0052988 A1 * | 2/2021 | Fear ............ A63F 13/795 |
| 2022/0387890 A1 * | 12/2022 | Rispoli ............ H04N 21/23418 |
| 2023/0277929 A1 * | 9/2023 | Rispoli ............ A63F 13/86 463/31 |

OTHER PUBLICATIONS

International application No. PCT/CA2021/051549 Search Strategy dated Mar. 1, 2022.
International application No. PCT/CA2021/051549 Written Opinion of the International Searching Authority dated Mar. 1, 2022.
Patentability search material: FNCS Broadcast Plan & Server Replays. By The Fortnite Team. Aug. 16, 2019. Retrieved on Sep. 9, 2020 from https://www.epicgames.com/fortnite/competitive/en-US/news/fncs- broadcast-plan-server-replays.
Patentability search material: Rare Replay Collection Wiki Guide by Brendan Graeber, and others. Snapshots. Updated Aug. 3, 2015. Retrieved on Sep. 9, 2020 from https://www.ign.com/wikis/rare-replay-collection/Snapshots.
Patentability search material: NVIDIA Shadowplay™ Record and Capture Your Greatest Gaming Moments. Instantly Replay and Record. Retrieved on Sep. 9, 2020 from https://www.nvidia.com/en-us/geforce/geforce-experience/shadowplay.
Patentability search material: Replay. Retrieved on Sep. 9, 2020 from https://wiki.teamfortress.com/wiki/Replay.

\* cited by examiner

GAME MOMENT IMPLEMENTATION SYSTEM AND METHOD OF USE THEREOF

The present application is a continuation application of U.S. patent application Ser. No. 17/879,017, filed on Aug. 2, 2022, which is a bypass continuation application of International PCT application No. PCT/CA2021/051549 filed Nov. 2, 2021, designating the United States, that claims priority from U.S. provisional patent application No. 63/110, 195 filed on Nov. 5, 2020, incorporated herein by reference, and U.S. provisional patent application No. 63/217,147 filed on Jun. 30, 2021, incorporated herein by reference.

TECHNICAL FIELD

The present disclosure relates to gaming, and more particularly to systems for playing select in-game highlights.

BACKGROUND

Videogame streaming has become a popular vehicle for users to consume videogames. Users may select a videogame for playing on streaming platforms such as OnMobile™, where the videogame is streamed on the smartphone or tablet of the user. Streaming platforms also exist for computers or laptops.

As users play a videogame, users may create custom challenges amongst themselves that are beyond the initial challenges or win conditions set by the videogame developer. For instance, the users may start in a level of a videogame with hostile units, and challenge users to complete the level by performing a "passive run", where you complete the level without eliminating any hostile units. In other examples, the challenge may be to complete a map in the videogame without wearing any armor or without any weapons. However, as these custom challenges are orchestrated by the user community, the videogame may not be adapted to measure the performance of users when undertaking these custom challenges.

As such, it would be advantageous to develop a system for offering users a set of custom challenges for a particular videogame, where the custom challenge did not originally exist in the original videogame. Moreover, the system could offer the user with the opportunity to play the videogame at certain instances within the videogame.

Finally, unlike current systems for allowing users to play specific moments in the video, it would be further advantageous to offer a system that does not alter, or only minimally alters, the base game, in order to ascertain the progress of the base game to determine when the moment has ended.

SUMMARY

The present disclosure relates to a system for playing moments of a videogame, where each moment is associated with a videogame snapshot, corresponding to a point within the videogame. The moment may alter the snapshot to adapt the challenge and/or the goals of the base game of the snapshot.

A broad aspect of the present disclosure is a system where the moment is associated with a script or an overlay script providing information on the execution of the moment when the emulator runs the snapshot associated with the moment.

Another broad aspect is a system including software to perform image analysis of the image stream of the run videogame to collect and compile videogame on the progress of the videogame snapshot. As the image analysis is performed on the image stream that is to be displayed on the computing device of the user, the image analysis enables the system to collect information on the progress of the user in the snapshot game without having to receive or analyse the game data of the run videogame, instead analyzing the image once generated by the videogame's program code.

For instance, the system generates metadata from the analysis of the image objects appearing in the video stream, the metadata analyzed to determine the progress of the videogame. In some examples, the image object may be that of a score, a timekeeper, a number of objects collected, the state of an enemy to be neutralized in the gamer, the health of the player's character, etc. In the example of the score, the metadata may be that of the value appearing in the score image object. The metadata analysis involves comparing the score value with a set threshold value. When the set threshold value is reached, the system sends a command to end the snapshot of the game, ending the streaming of the videogame, where the reaching of the set threshold value is an indication that the user has reached the objective of the snapshot.

Another broad aspect is a method for implementing a moment of a videogame for playing a portion of a videogame. The method includes receiving user selection input, provided on a computer of the user, of a moment of a particular videogame associated with starting at a particular progress point of the particular videogame other than a beginning of the particular videogame, the moment associated with one or more end conditions for stopping a playing of the particular videogame; causing an emulation to start of the particular videogame for streaming on the computer of the user, the stream including an image stream of the particular videogame, starting at the specific progress point corresponding to the selected game moment; performing image analysis of the image stream for display on a display of the computer of the user to generate metadata on progress of the particular game by the user; determining if the one or more end conditions is met through analysis of the metadata on the progress of the particular game generated through image analysis; and causing the emulation to end, resulting in an end of the streaming of the particular game on the computer of the user, if at least one of the one or more end conditions is met.

In some embodiments, the image analysis may include object recognition to identify image objects in the image stream.

In some embodiments, the object recognition may be to identify at least one of hostile unit image objects and resource image objects appearing in the image stream.

In some embodiments, the image analysis may include optical character recognition to identify characters appearing in the image stream.

In some embodiments, the optical character recognition may identify at least one of a score and a timer included in image frames of the image stream.

In some embodiments, the method may include generating an overlay for transmission to the computer of the user, wherein the overlay may be added onto an image of the streamed particular game appearing on a display of the computer of the user, the overlay adding information, associated with the selected moment, to the image absent from the image stream corresponding to the stream of the particular game.

In some embodiments, the method may include updating the information added by the overlay as the user progresses through the game, wherein the updating of the information may be performed based on the analyzed metadata on the progress of the particular game generated through image analysis.

In some embodiments, at least one of the one or more end conditions of the selected moment may be different from an end condition of the particular game.

In some embodiments, the image analysis may be performed in accordance with instructions provided by a script generated for the selected moment, the instructions affecting a type of metadata generated through the image analysis.

In some embodiments, the method may include dividing the image into information-rich and information-poor portions, wherein the image analysis of the image stream may be performed in the information-rich portions of the graphical user interface.

Another broad aspect is a method for implementing a moment of a videogame for playing a portion of the videogame starting at a particular starting point, the moment associated with snapshot data for starting to stream the videogame at the particular progress point. The method includes receiving user selection input, provided on a computer of the user, of a moment of a videogame associated with starting at a particular progress point of the videogame other than a beginning of the videogame; generating a script for the selected moment defining one or more end conditions for stopping a playing of the videogame; retrieving snapshot data of the videogame corresponding to the selected moment, the snapshot data including information for starting a stream of the videogame at the particular progress point; causing a start of an emulation to stream the snapshot data to the computer of the user for enabling gameplay of the videogame at the particular progress point on the computer of the user; monitoring progress of the gameplay by the user to determine if one of the one or more end conditions defined by the script has been reached; and causing an end of the emulation when the one of the one or more end conditions has been met.

In some embodiments, at least one of the one or more end conditions may be different from the end conditions of the videogame.

In some embodiments, the one or more end conditions of the script may define a win condition and a loss condition, wherein the win condition may be different from a win condition of the videogame.

In some embodiments, the monitoring the progress of gameplay may be performed through image analysis of an image stream of the stream of the snapshot data.

In some embodiments, metadata may be generated from the image analysis for determining the progress of gameplay, and wherein the determining if the one or more end conditions of the script is met may be by analyzing the generated metadata to determine if the one or more end conditions of the script is met.

In some embodiments, the generated metadata may include one or more values attributable to image objects or characters appearing in the image stream, and wherein at least one of the one or more end conditions may include a value that is compared with the one or more values included in the generated metadata to determine if the at least one of the one or more end conditions is met.

In some embodiments, the one or more conditions may include one or more of a lose condition when the life total of a player of the user reaches 0; a win condition when a timer clocks down to 0; a lose condition when a time clocks down to 0; and a win condition when a hostile unit appearing the snapshot is defeated.

In some embodiments, more than one moment selectable by the user may be associated with the snapshot data, and wherein a different script may be generated for each of the more than one moment, and wherein each script may have at least one different end condition.

In some embodiments, the method may include generating an overlay for transmission to the computer of the user, wherein the overlay may be added onto an image of the streamed snapshot data appearing on a display of the computer of the user, the overlay adding information for the user indicative of how close the user is to meeting at least one of the one or more end conditions of the script.

In some embodiments, the method may include displaying a message through the overlay indicative of one of the one or more conditions of the script being met when the one of the one or more conditions is met.

Another broad aspect is a computing device for implementing a moment of a videogame for playing a portion of a videogame. The computing device includes memory to store data and instructions; a processor in communication with the memory; instructions stored in memory that, when executed by the processor, cause the processor to: receive user selection input, provided on a computer of the user, of a moment of a particular videogame associated with starting at a particular progress point of the particular videogame other than a beginning of the particular videogame, the moment associated with one or more end conditions for stopping a playing of the particular videogame; cause an emulation to start of the particular videogame for streaming on the computer of the user, the stream including an image stream of the particular videogame, starting at the specific progress point corresponding to the selected game moment; perform image analysis of the image stream for display on a display of the computer of the user to generate metadata on progress of the particular game by the user; determine if the one or more end conditions is met through analysis of the metadata on the progress of the particular game generated through image analysis; and cause the emulation to end, resulting in an end of the streaming of the particular game on the computer of the user, if the of more end conditions is met.

In some embodiments, the image analysis may include object recognition to identify image objects in the image stream.

In some embodiments, the object recognition may be to identify at least one of hostile unit image objects and resource image objects appearing in the image stream.

In some embodiments, the image analysis may include optical character recognition to identify characters appearing in the image stream.

In some embodiments, the optical character recognition may identify at least one of a score and a timer included in image frames of the image stream.

In some embodiments, the computer device may include instructions stored in memory that, when executed by the processor, cause the processor to generate an overlay for transmission to the computer of the user, wherein the overlay is added onto an image of the streamed particular game appearing on a display of the computer of the user, the overlay adding information, associated with the selected moment, to the image absent from the image stream corresponding to the stream of the particular game.

In some embodiments, the computing device may include instructions stored in memory that, when executed by the processor, cause the processor to update the information added by the overlay as the user progresses through the game, wherein the updating of the information is performed based on the analyzed metadata on the progress of the particular game generated through image analysis.

In some embodiments, at least one of the one or more end conditions of the selected moment may be different from an end condition of the particular game.

In some embodiments, the image analysis may be performed in accordance with instructions provided by a script generated for the selected moment, the instructions affecting a type of metadata generated through the image analysis.

In some embodiments, the computing device may include instructions stored in memory that, when executed by the processor, cause the processor to divide the image into information-rich and information-poor portions, wherein the image analysis of the image stream is performed in the information-rich portions of the graphical user interface.

Another broad aspect is a computing device for implementing a moment of a videogame for playing a portion of the videogame starting at a particular starting point, the moment associated with snapshot data for starting to stream the videogame at the particular progress point. The computing device includes memory to store data and instructions; a processor in communication with the memory; instructions stored in memory that, when executed by the processor, cause the processor to receive user selection input, provided on a computer of the user, of a moment of a videogame associated with starting at a particular progress point of the videogame other than a beginning of the videogame; generate a script for the selected moment defining one or more end conditions for stopping a playing of the videogame; retrieve snapshot data of the videogame corresponding to the selected moment, the snapshot data including information for starting a stream of the videogame at the particular progress point; cause a start of an emulation to stream the snapshot data to the computer of the user for enabling gameplay of the videogame at the particular progress point on the computer of the user; monitor progress of the gameplay by the user to determine if one of the one or more end conditions defined by the script has been reached; and cause an end of the emulation when the one of the one or more end conditions has been met.

In some embodiments, at least one of the one or more end conditions may be different from the end conditions of the videogame.

In some embodiments, the one or more end conditions of the script may define a win condition and a loss condition, wherein the win condition may be different from a win condition of the videogame.

In some embodiments, the monitoring the progress of gameplay may be performed through image analysis of an image stream of the stream of the snapshot data.

In some embodiments, metadata may be generated from the image analysis for determining the progress of gameplay, and wherein the determining if the one or more end conditions of the script is met may be by analyzing the generated metadata to determine if the one or more end conditions of the script is met.

In some embodiments, the generated metadata may include one or more values attributable to image objects or characters appearing in the image stream, and wherein at least one of the one or more end conditions may include a value that is compared with the one or more values included in the generated metadata to determine if the at least one of the one or more end conditions is met.

In some embodiments, the one or more conditions may include one or more of
a lose condition when the life total of a player of the user reaches 0; a win condition when a timer clocks down to 0; a lose condition when a time clocks down to 0; and a win condition when a hostile unit appearing the snapshot is defeated.

In some embodiments, more than one moment selectable by the user may be associated with the snapshot data, and wherein a different script may be generated for each of the more than one moment, and wherein each script may have at least one different end condition.

In some embodiments, the computing device may include instructions stored in memory that, when executed by the processor, cause the processor to generate an overlay for transmission to the computer of the user, wherein the overlay is added onto an image of the streamed snapshot data appearing on a display of the computer of the user, the overlay adding information for the user indicative of how close the user is to meeting at least one of the one or more end conditions of the script.

In some embodiments, the computing device may include instructions stored in memory that, when executed by the processor, cause the processor to display a message through the overlay indicative of one of the one or more conditions of the script being met when the one of the one or more conditions is met.

Another broad aspect is a system for implementing a moment of a videogame for playing a portion of a videogame. The system includes the computing device as defined herein; and an application program stored in memory on the computing device of the user, that, upon execution by a processor of the computing device, causes the processor to generate a graphical user interface on a display of the computing device of the user providing a user with a plurality of moments to select from, wherein each moment of the plurality of moments is associated with snapshot data for starting a videogame at a particular progress point of the videogame, wherein the plurality of moments are related to a plurality of videogames; receive user selection input of a moment from the plurality of moments; receive the stream of the snapshot data, and generate on the display of the computing device of the user an image associated with the videogame based on the received stream; and after no longer receiving the stream of the snapshot data, generate again the graphical user interface on the display of the computing device of the user providing the user with a plurality of moments to select from.

Another broad aspect is non-transitory computer-readable storage medium including instructions for, upon execution by a processor of the computer, causing the processor to receive user selection input, provided on a computer of the user, of a moment of a particular videogame associated with starting at a particular progress point of the particular videogame other than a beginning of the particular videogame, the moment associated with one or more end conditions for stopping a playing of the particular videogame; cause an emulation to start of the particular videogame for streaming on the computer of the user, the stream including an image stream of the particular videogame, starting at the specific progress point corresponding to the selected game moment; perform image analysis of the image stream for display on a display of the computer of the user to generate metadata on progress of the particular game by the user; determine if the one or more end conditions is met through analysis of the metadata on the progress of the particular game generated through image analysis; and cause the emulation to end, resulting in an end of the streaming of the particular game on the computer of the user, if the of more end conditions is met.

Another broad aspect is non-transitory computer-readable storage medium including instructions for, upon execution by a processor of the computer, causing the processor to generate a script for the selected moment defining one or more end conditions for stopping a playing of the videogame; retrieve snapshot data of the videogame corresponding to the selected moment, the snapshot data including information for starting a stream of the videogame at the particular progress point; cause a start of an emulation to stream the snapshot data to the computer of the user for enabling gameplay of the videogame at the particular progress point on the computer of the user; monitor progress of the gameplay by the user to determine if one of the one or more end conditions defined by the script has been reached; and cause an end of the emulation when the one of the one or more end conditions has been met.

Another broad aspect is a method of seamlessly streaming videogame portions corresponding to a plurality of videogame moments, wherein each moment is associated with a portion of a particular videogame starting at a particular progress point of the particular videogame. The method includes, upon a user completing a videogame moment by reaching an end condition of the videogame moment, querying a moment playlist data structure defining a playlist of videogame moments including the completed videogame moment; selecting another videogame moment of the playlist of videogame moments as defined in the moment playlist data structure; and causing an emulation to start of the particular videogame starting at the specific progress point corresponding to the identified another videogame moment, wherein moments following the completion of another videogame moment are selected from the moment playlist data structure.

Another broad aspect is a computing device for implementing seamless streaming of videogame portions corresponding to a plurality of videogame moments, wherein each moment is associated with a portion of a particular videogame starting at a particular progress point of the particular videogame. The computing device includes memory to store data and instructions; a processor in communication with the memory; instructions stored in memory that, when executed by the processor, cause the processor to, upon a user completing a videogame moment by reaching an end condition of the videogame moment, query a moment playlist data structure defining a playlist of videogame moments including the completed videogame moment; select another videogame moment of the playlist of videogame moments as defined in the moment playlist data structure; and cause an emulation to start of the particular videogame starting at the specific progress point corresponding to the identified another videogame moment, wherein moments following the completion of the another videogame moment are selected from the moment playlist data structure.

Another broad aspect is non-transitory computer-readable storage medium including instructions for implementing seamless streaming of videogame portions corresponding to a plurality of videogame moments, wherein each moment is associated with a portion of a particular videogame starting at a particular progress point of the particular videogame by, upon execution by a processor of the computer, causing the processor to upon an end condition of the videogame moment being met indicating of the completion of the videogame moment, query a moment playlist data structure defining a playlist of videogame moments including the completed videogame moment; select another videogame moment of the playlist of videogame moments as defined in the moment playlist data structure; and cause an emulation to start of the particular videogame starting at the specific progress point corresponding to the identified another videogame moment, wherein moments following the completion of the another videogame moment are selected from the moment playlist data structure.

BRIEF DESCRIPTION OF THE DRAWINGS

The invention will be better understood by way of the following detailed description of embodiments of the invention with reference to the appended drawings, in which.

DETAILED DESCRIPTION

Figure 1:
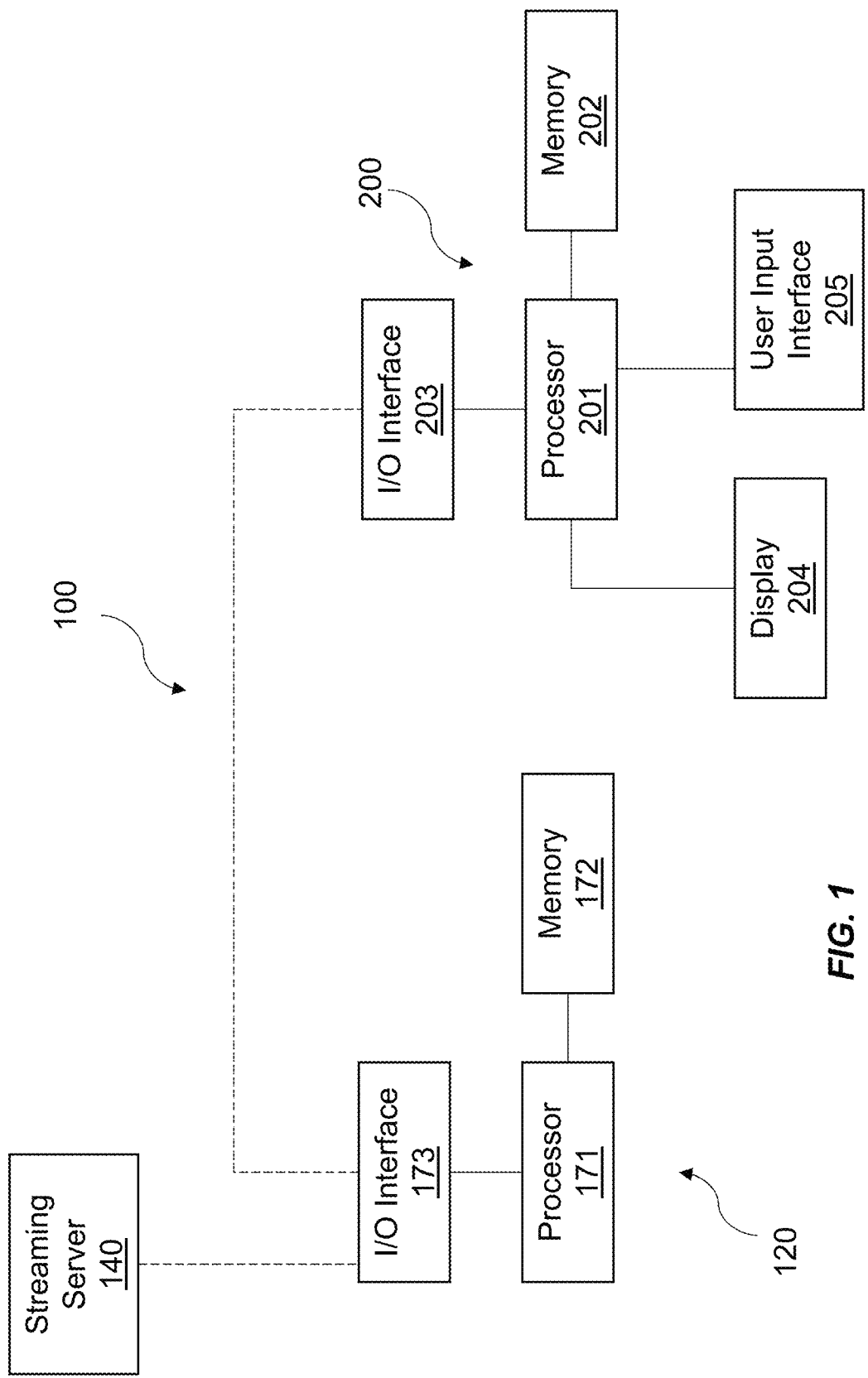
FIG. 1 is a block of an exemplary system for providing videogame moments and for running snapshots to provide users with selected videogame moments.

The present disclosure relates to a system for providing one or more users with a selection of moments associated with a plurality of videogames, allowing the user(s) to experience or re-experience defined portions within the videogame with the base parameters of the videogame or through an added set of parameters defined by a moment script of the moment that can alter how the user undertakes that particular portion of the game. As such, the moment can alter the gaming experience, adding variety to the particular portion of the videogame.

Moreover, as the script associated with the moment does not alter the base program code associated with the videogame or the snapshot code of the videogame, a videogame developer may implement moments for a particular videogame, adding a variety of new challenges and objectives to the videogame, without having to expend extensive resources altering the base videogame program code, saving resources.

Additionally, the system may monitor progress of the user within the snapshot to assess user performance and/or when the snapshot should end as the user has reached an endpoint of the moment by generating metadata associated with the running of the videogame without accessing the source data of the running of the videogame. More particularly, the system may perform image analysis of the image stream generated by the executed program code of the videogame, that is to appear on the display of the user's computing device. Metadata is generated from the image analysis that is further assessed by the system to provide an indicator as to the progress of the user in the videogame snapshot.

Definitions

In the present disclosure, by "moment", it is meant an instance of a videogame defined by snapshot data and by specific parameters detailed in a moment script for determining at least when to end the snapshot of the videogame (e.g. win conditions, lose conditions), and may define different rules for calculating a score of a user when playing the snapshot. Many moments may exist for a single snapshot, where each moment may define, e.g., different end conditions, different conditions for increasing the player's score, etc. For instance, a snapshot in the videogame may start at a point where a player is to engage with a boss hostile unit. However, the moment may specify that a win condition is to not damage the boss hostile unit for a given time, and the snapshot ends when damage is first dealt to the boss hostile unit, a timer runs out, or the player reaches 0 hit points. Another moment associated with the same snapshot may be to take down the same boss hostile unit under 60 seconds, where the snapshot ends when one of the following conditions is met: the player's hit points reaches 0; the timer equals 60 seconds; or the hit points of the boss hostile unit reaches 0. As such, the moment provides a script for determining progress of the user in the snapshot of the videogame, where the moment sets a unique challenge for the user in the videogame when playing the streamed snapshot.

In the present disclosure, by "player" it is meant the character controlled by the user when playing a videogame, or the in-game manifestation of the user controlled by the user when playing the videogame.

In the present disclosure, by "snapshot", it is meant program code that, when executed by a processor of a computing device, streamed to the computing device, causes the processor to generate a videogame for a user to play at a particular progress point in the videogame and with a particular game state, such that the user starts playing the videogame at that particular progress point. The progress point may be the start of a specific trial, such as a timed challenge in the base game, the point before engaging with a boss hostile unit, etc. The snapshot may specify in its data a game state setting certain conditions or properties of the game at that point, such as the equipment of the player at that point, the starting resources, the starting life total (e.g. hit points), the number and character of hostile units, the number and character of the allied units, etc. There may be multiple snapshots associated with a single videogame, where each snapshot may be associated with a different progress point in the videogame.

In the present disclosure, by "user", it is meant the real-world person who is playing a videogame, controlling the player.

Exemplary System for Providing a Catalogue of Moments in One or More Videogames for Play by a User:

Reference is made to FIG. 1, illustrating an exemplary system 100 for providing a catalogue of moments in one or more videogames that can be played by a user.

The system 100 includes a server 120, a snapshot database 143 and may interact with one or more computing devices 200 of users on which the snapshot of a videogame may be played.

The server 120 has a processor 171, memory 172 and an input/output interface 173.

The processor 171 may be a general-purpose programmable processor. In this example, the processor 171 is shown as being unitary, but the processor may also be multicore, or distributed (e.g. a multi-processor).

The computer readable memory 172 stores program instructions and data used by the processor 171. The memory 172 may be non-transitory. The computer readable memory 172, though shown as unitary for simplicity in the present example, may comprise multiple memory modules and/or cashing. In particular, it may comprise several layers of memory such as a hard drive, external drive (e.g. SD card storage) or the like and a faster and smaller RAM module. The RAM module may store data and/or program code currently being, recently being or soon to be processed by the processor 171 as well as cache data and/or program code from a hard drive. A hard drive may store program code and be accessed to retrieve such code for execution by the processor 171 and may be accessed by the processor 171 to store, moment scripts, metadata obtained through image analysis, saved image stream associated with a playthrough of the snapshot, etc. as explained herein. The memory 172 may have a recycling architecture for storing, for instance, moment scripts, metadata obtained through image analysis, saved image stream associated with a playthrough of the snapshot, performance scores, etc., where older data files are deleted when the memory 172 is full or near being full, or after the older data files have been stored in memory 172 for a certain time.

The input/output interface 173 is in communication with the processor 171. The I/O interface 173 is a network interface and may be a wireless interface for establishing a remote connection with, for example, a remote server, an external database such as snapshot database 143 (e.g. through an application program interface as described herein) or a streaming server 140, one or more computing devices 200, etc. For instance, the I/O interface 173 may be an Ethernet port, a WAN port, a TCP port, etc.

The processor 171, the memory 172 and the I/O interface 173 may be linked via BUS connections.

The computing device 200 is the device on which the user plays the snapshot of the videogame.

The computing device 200 has a processor 201, memory 202, a display 204, a user input interface 205, an I/O interface 203.

The memory 202 may store program code for a moment catalogue application program that, when executed by the processor 201, causes the processor 201 to generate on the display 204 a graphical user interface providing a selection of moments for the user to select from, where each of the moments is associated with a base game.

The user input interface 205 may be a keyboard, a mouse, a touchscreen (where the display is a touchscreen and also serves as a user input interface), a microphone, one or more accelerometers to ascertain movements of the computing device or of a peripheral held by the user, a proximity sensor or camera to detect movements and/or position of the user, etc.

The computing device 200 may be connected to the server 120 via a remote connection, such as via the Internet, established between I/O interface 173 (having a unique address; e.g. IP address) and the I/O interface 203 (also having a unique address; e.g. IP address) (where the computing device 200 may communicate wirelessly with the server 120).

The connection between the server 120 and the streaming server 140 (including the snapshot database 143) may be wired or wireless.

Figure 2:
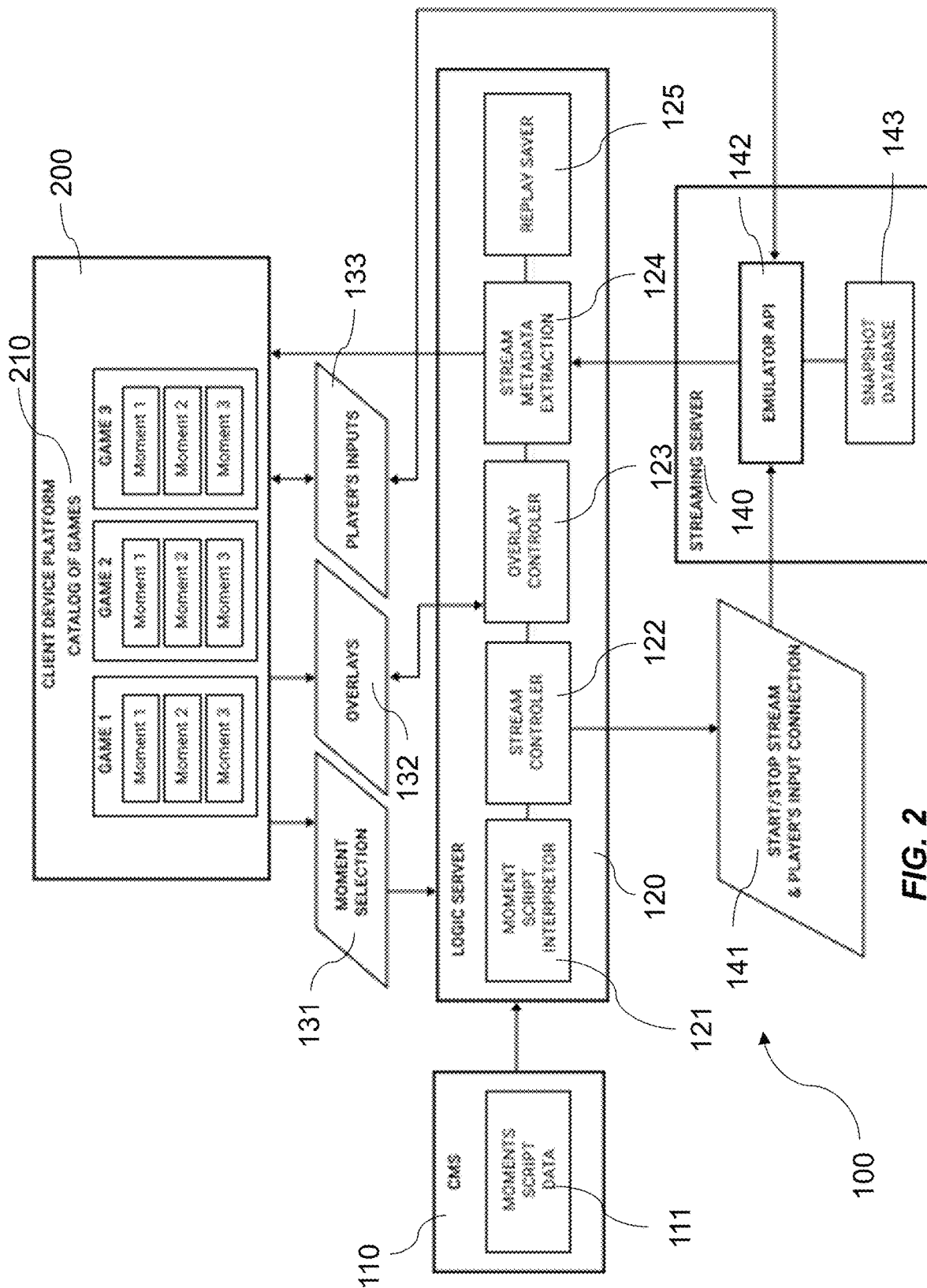
FIG. 2 is another block diagram of the exemplary system of FIG. 1.

With reference now to FIG. 2, the server 120 manages the implementation of a moment through a videogame snapshot. The system 100 also includes an emulator application program interface (API) 142. The snapshot corresponding to the moment is streamed onto the client's computing device 200 (e.g. a smartphone, a tablet computer, a desktop computer, a laptop, etc.) and may be modified as a function of a moments script associated with the moment selected by the user.

The server 120 includes a moment script interpreter 121 and a stream controller 122. The server 120 may include an overlay controller 123, a stream metadata extraction module 124 and a replay saver 125.

The moment script interpreter 121 of the server 120 includes program code stored in memory 172 of the server 120 that, when executed by the processor 171, causes the processor 171 to read and interpret the script data of a moment received from the content management system 110. The moment script interpreter 121 then causes the processor 171 to generate and transmit a command to the stream controller 122 to initiate the snapshot associated with the moment, as defined in the moment script data.

The stream controller 122 of the server 120 includes program code stored in memory 172 of the server 120 that, when executed by the processor 171, causes the processor 171 to receive the command to initiate the snapshot for the moment from the moment script interpreter 121, and then to generate and transmit a command 141 to the emulator API 142 (e.g. via I/O interface 173), to start the stream of the snapshot associated with the moment. The start command 141 contains identifier information on the given snapshot to start, corresponding to the information provided by the moments script data 111.

In some embodiments, the server 120 includes program code for an overlay controller 123 stored in memory that, when executed by the processor, causes the processor to generate an overlay 132 of information that is added to the image of the image stream that is displayed on the display 204 of the computing device 200. The overlay 132 may include added objects or text to the displayed image of the image stream of the videogame, such as numbers of characters for a score, a timer, the name of the moment, etc. The overlay 132 provides the user with added information for the moment, the information added to the image of the snapshot of the videogame available on the display of the user, enhancing the experience of the user when completing the moment or sharing with the user information that the user requires for carrying out the moment. The overlay 132 may be one or more user interface components such as a timer bar, one or more pop ups, such as a score, questions, buttons, status messages, etc. presented on the image of the videogame available to the user through the display of the computing device. These interface components may be accessible using an application program interface (API) for controlling or triggering them through the overlay controller 123, where data for the overlay 132 may be sent via the overlay controller 123. For the timer component, the timer component may be set up by the overlay controller 123 on the overlay 132, and the time may be updated locally (e.g. second by second) (no need to receive timer pings from the overlay controller 123). The overlay controller 123 may issue a command to stop the timer. Moreover, the overlay controller 123 may receive the metadata generated by the stream metadata extraction module 124 and may also receive information from the moment script interpreter 121 on the script for the moment. The overlay controller 123 may control the overlay 132 as a function on the script of the moment in order to execute the logic involved for that moment, and update the information of the overlay 132 as a function of the generated or extracted metadata from the stream metadata extraction module 124.

In some embodiments, the server 120 includes program code for media stream extraction 124 stored in memory 172 that, when executed by the processor 171, causes the processor 171 to perform image analysis of the image stream associated with the game snapshot, run by the emulator. The analysis of the image stream results in the generation of metadata associated with the game snapshot (e.g. the progress of the game snapshot). As such, the media stream extraction program code 124 provides certain information on the progress of the game without altering the source code of the videogame or requiring the source code of the videogame that is the basis of the snapshot, to e.g., verify if the conditions for ending the moment, defined in the moment script data, are met.

In some embodiments, the server 120 includes program code for a replay saver 125, stored in memory 172, that causes the processor 171 to, upon execution by the processor 171, save a video file of the execution of the snapshot by the user in a database, the video file including metadata on the moment (e.g. the user's player identifier, a timestamp, information on the length of the snapshot, the game associated with the moment, the score, etc.)

The content management system (CMS) 110 contains program code that, when executed by the processor, causes the processor to receive from the server 110 user input corresponding to a selection of a moment to play, and generates a script for the specific moment 111. The script for the moment includes information to allow for the running of the moment by executing the program code of a given videogame snapshot associated with the snapshot, including the conditions for ending the snapshot.

Figure 5:
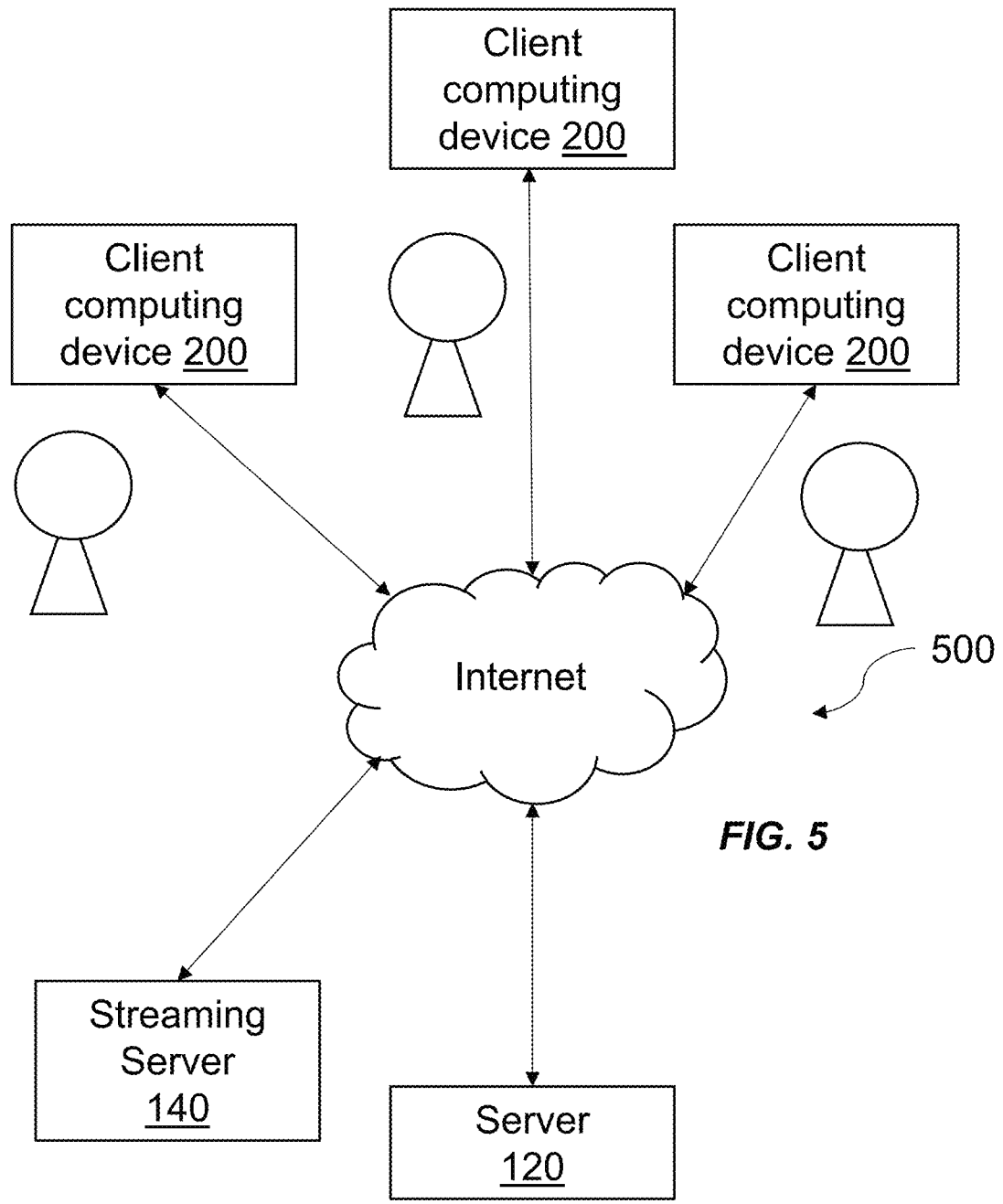
FIG. 5 is a block diagram of an exemplary network for playing moments of a videogame.

Exemplary Network for Playing Moments of a Videogame:

Reference is now made to FIG. 5, illustrating an exemplary network 500 for playing moments of one or more videogames.

As shown in FIG. 5, the server 120 can service a plurality of client computing devices 200, where each computing device 200 may have access to a catalogue of available moments of a videogame through a website or through a moment catalogue application program stored in memory of the computing device 200.

The moments available for play may differ from one user to the next (e.g. based on the profile of the user). The moments available may be dependent on the subscription package associated with the profile, the completion by the user of certain moments that unlock new moments, the geolocation of the user or of the computing device, the time of year, etc.

Each computing device 200 may be associated with a given address (e.g. a given IP address), the server 120 (or emulator) transmitting the corresponding snapshot data (and, in some examples, the overlay 132) to the address of the computing device 200 having selected a given moment.

Figure 3:
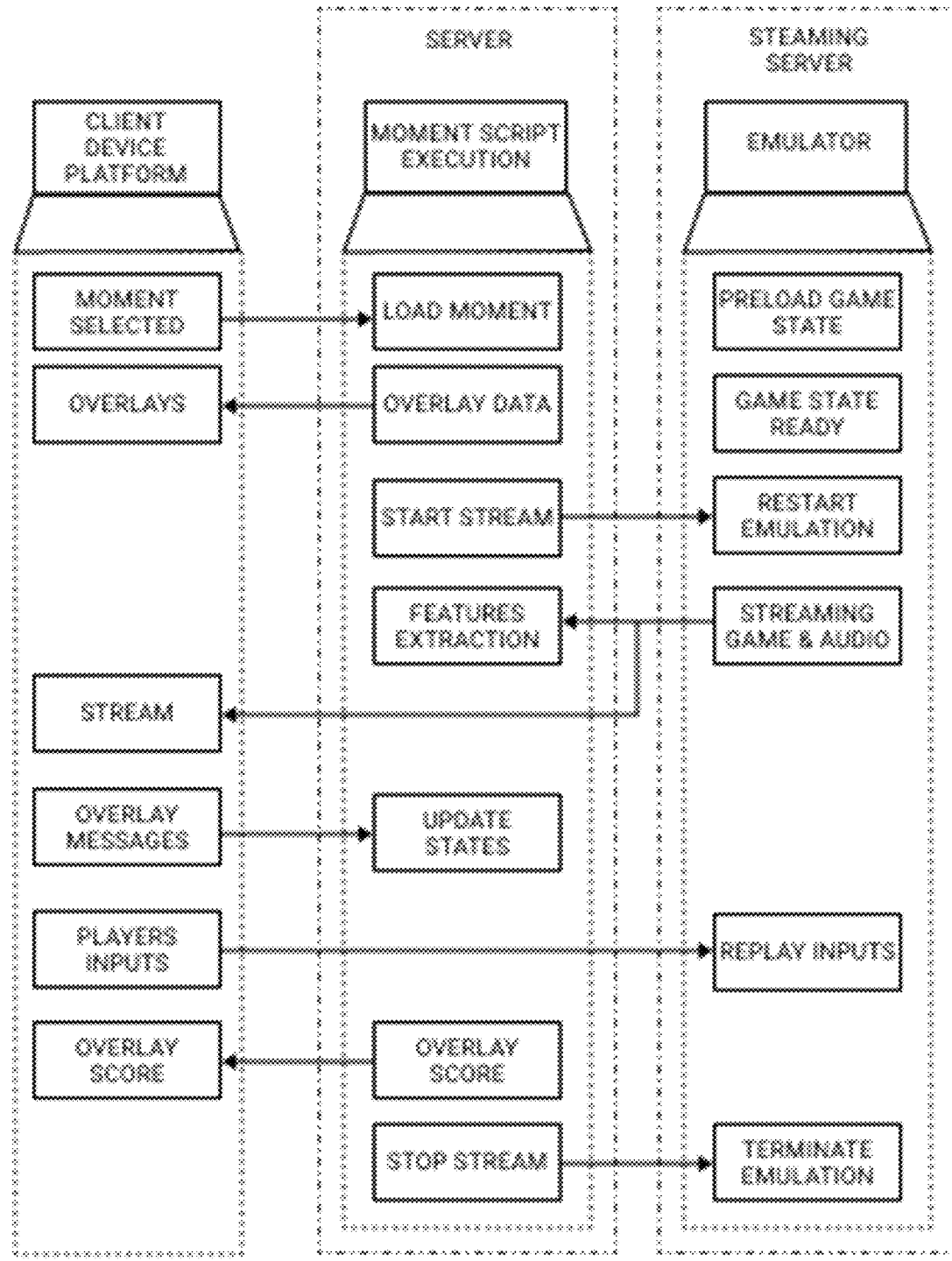
FIG. 3 is an event flow diagram showing the interactions between the different elements of the system and the computing device.

Exemplary Method of Implementing a Moment of a Videogame:

Reference is now made to FIG. 3, illustrating flow of an exemplary method of implementing a moment of a videogame associated with a snapshot of the videogame. For illustrative purposes, reference will be made to system 100 and to computing device 200. However, it will be understood that any system and/or computing device in accordance with the present teachings may be used.

A user can select a moment of a videogame from a selection of moments (originating from one or more videogames) from the computing device 200. The videogames may originate from one or more videogame developers, where the code for the one or more videogames may be stored in respective databases managed by the respective videogame developer.

The selection of moments is presented through a graphical user interface provided on the display of the computing device 200. The graphical user interface may be provided via a website, be produced by a processor 201 of the computing device 200 executing the program code of a game catalog application program stored in the memory 202 of the computing device 200. The user may have access to certain moments only after certain criteria have been met (e.g. the user has paid for an added subscription; the user has completed some other moments; the user has been using the platform for a portion of time; it is a specific day of the year, etc.)

The user's selection of a specific moment is transmitted from the computing device 200 to the server 120 as moment selection information 131.

Figure 7:
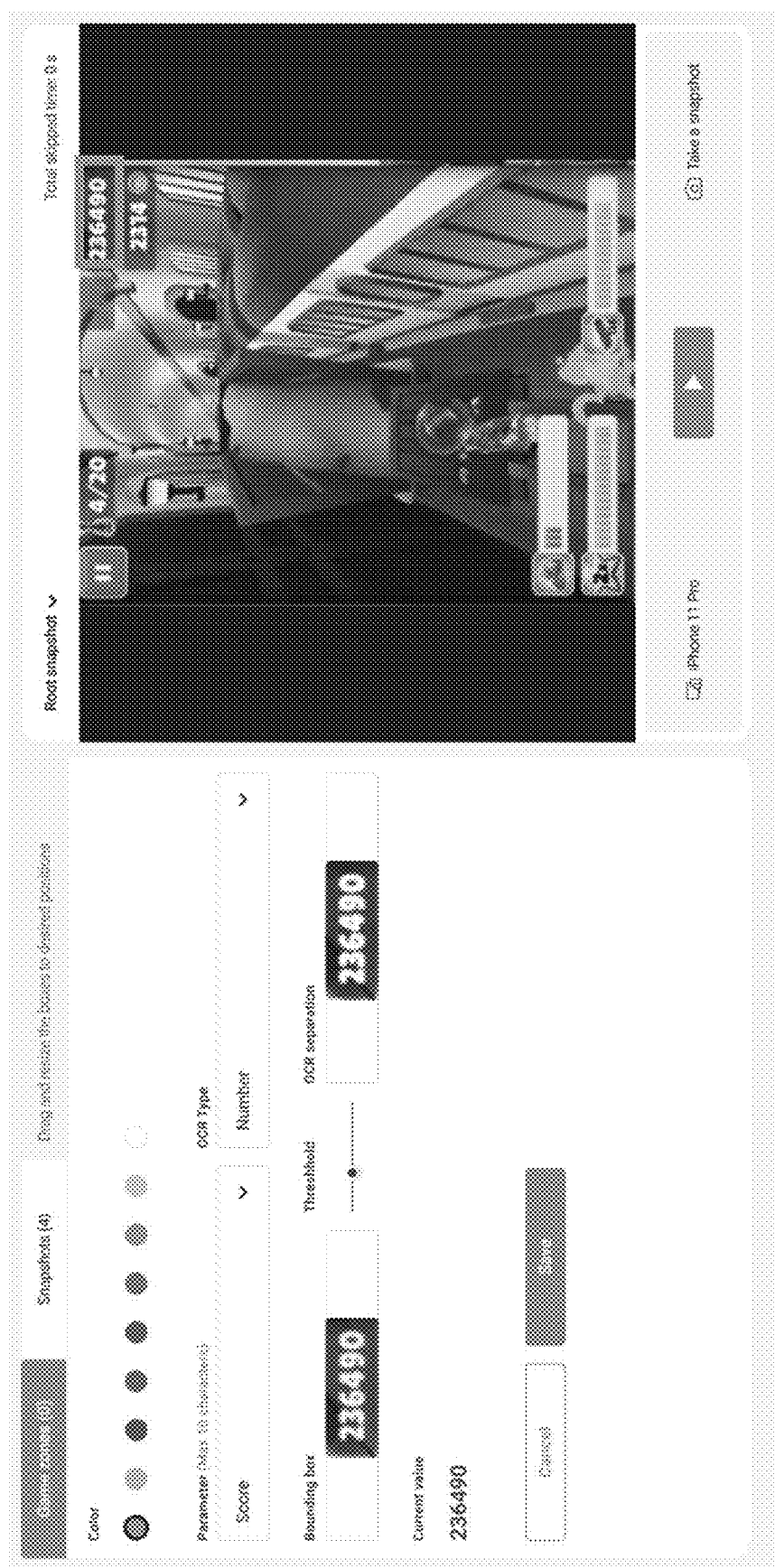
FIG. 7 is a screen capture of an exemplary graphical user interface showing exemplary optical character recognition performed on an exemplary image of a streamed snapshot of a videogame.
Figure 8:
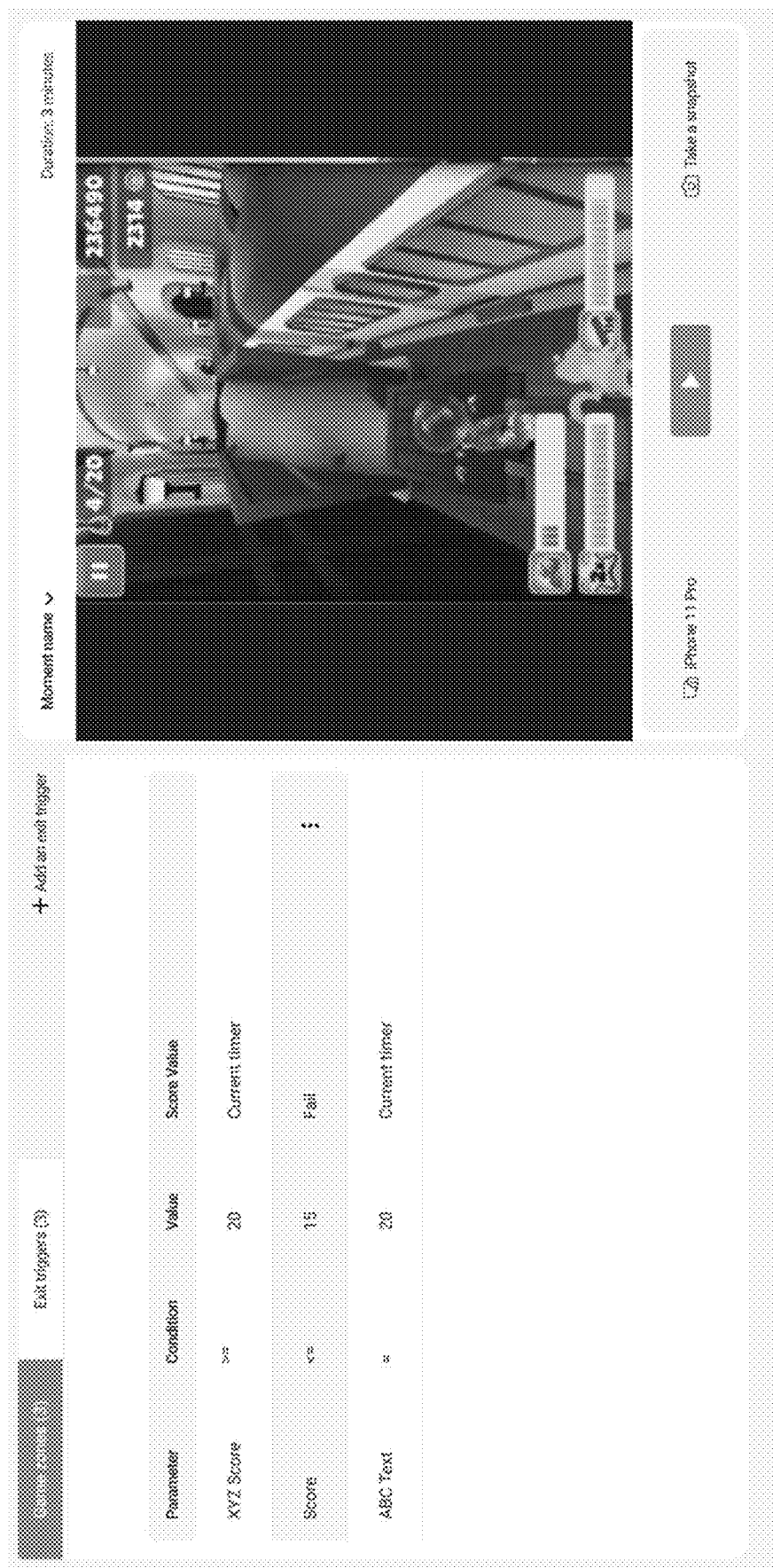
FIG. 8 is a screen capture of an exemplary graphical user interface showing an exemplary set of end conditions for a script of a moment for an exemplary snapshot of a videogame.

In some examples, the graphical user interface for selecting the moment may provide the user with one or more options for setting the conditions of the moment (e.g. or winning conditions). For instance, as shown in FIG. 8, exit triggers (e.g. end conditions) may be set for a given moment by the user. The graphical user interface may also provide the user with the image analysis information that led to a given value or score extraction, as shown in FIG. 7.

Upon the server 120 receiving the moment selection information 131 from the computing device 200, the server 120 generates and transmits a command to the content management system (CMS) 110 to generate a script for the specific moment 111. The script for the moment includes information to execute the given snapshot, including providing information on when to end the snapshot. For instance, an exemplary script for a moment may include, but is not limited to, the following information:

An identifier of a snapshot associated with the moment, retrievable from the snapshot database 143;
one or more triggers that are readable in real-time during gameplay to cause an action to be performed during gameplay;
one or more conditions for causing the streaming of the snapshot data to end, the meeting of the one or more conditions defining the end of the moment;
instructions for the overlay controller 132 to generate an overlay 123 tailored to the specific moment;
metadata such as icon data for the moment, a string of characters for a moment description in certain languages, a "type" indicator for the moment, etc.
instructions for the metadata extraction module 124;
parameters for calculating a score for the user streaming the snapshot associated to the moment.

The moment script data is transmitted from the content management system 110 to the server 120.

The moment script interpreter 121 of the server 120 causes the processor 171 to read and interpret the script data of the moment received from the content management system 110. The moment script interpreter 121 then causes the processor 171 to generate and transmit a command to the stream controller 122 to initiate the snapshot for the moment, the command including information on the snapshot associated with the moment.

The stream controller 122 causes the processor 171 to receive the command to initiate the snapshot for the moment, and then generates and transmits a command 141 to the emulator API 142 of the streaming server 140 to start the stream of the snapshot associated with the moment by retrieving the snapshot data for generating the videogame at a particular progress point in the game (and in a game state) associated with the snapshot. The start command 141 contains identifier information on the given snapshot to retrieve and start, corresponding to the information provide by the moments script data 111.

The emulator API 142 interfaces with the snapshot database 143, and receives the command to start the emulation of the snapshot. The emulator API 142 causes a query to be sent to the snapshot database 143 to retrieve the snapshot data associated with command, and with the selected moment. The emulator API 142 receives the retrieved snapshot data from the snapshot database 143 to run the game at the specific time.

The snapshot data is transmitted to the emulator of the streaming server 140, causing the emulator to run the snapshot data in order for the emulator to preload the videogame in a particular state associated with the snapshot data (e.g. at a progress point in the game, with specific set parameters such as the player's health, resources, equipment, etc.)

The game run by the emulator is streamed to the computing device 200, e.g. via the server 120 or directly to the computing device 200. In some embodiments, the server 120 generates an overlay 132 through the overlay controller 123. The overlay 132 may be generated by the overlay controller 123 as a function of the moment script data for the particular moment. The overlay 132 may add extra information or image information onto the image of the image streamed of the streamed snapshot appearing on the display 204 of the computing device 200 (i.e. an overlay of information onto the image, such as a chronometer, a score, the identifier of the moment, etc.)

In some embodiments, the overlay controller 123 may also act as a conduit of information between the computing device 200 streaming the snapshot and the emulator running the streamed snapshot of the videogame. For instance, user input provided on the computing device 200 may be collected by the overlay 132 and transmitted to the overlay controller 123, the overlay controller 123 then transmitting the user input to the emulator, such that the user input may be replayed on the emulator to cause the emulator to carry out the actions associated with the user input.

As such, as the user plays the snapshot on the computing device 200, user input 133 associated with playing the game is transmitted by the game catalog application program or website to the server 120. The user input is transmitted to a streaming server 140 that runs the emulator such that the actions corresponding to the input may be implemented into the progress of the snapshot of the game.

The streamed game and audio, as it is received by the server 120, is analyzed by the stream metadata extraction module 124. The stream metadata extraction module 124 analyzes the stream data (e.g. the image stream) by performing image analysis of the image stream associated with the streamed game snapshot, run by the emulator, for, e.g. feature extraction of the image stream. The analyzed image stream generates metadata associated with the game snapshot (e.g. the progress of gameplay).

The analysis of the image stream may be, for instance, optical character recognition to identify, e.g., text, numbers associated with a score, a timer, the number of hit points left for the user, a number of resources collected, etc. In some embodiments, the analysis of the image stream may include object recognition, using, e.g., analysis techniques known in the art, to identify (and, in some examples, track) certain objects appearing in the image frames of the image stream. Such objects may include, but are not limited to, equipment, the appearance of a threat or hostile unit to indicate its status, the existence and/or number of certain collectibles. The objects analyzed through image analysis may generate metadata that can be used to track the progress of the user in the snapshot. The user input 133 may also be sent to the media stream extraction program code 124, where the user input 133 may be analyzed to further improve the image analysis, where, e.g., certain image objects, or change in image objects, may be correlated with user input. For instance, the disappearance of a hostile in the image stream can be correlated with the pressing of a key for attacking. In some embodiments, the parameters of the image analysis may be adapted as a function of the moment script data, where the moment script data may provide instructions on the objects to identify.

In some examples, the stream metadata extraction module 124 may also received other streamed data of the streamed snapshot, such as audio data, and can further process the audio data to produce metadata (e.g. on the progress of the game). For instance, if the neutralizing of a hostile unit results in the generating of a sound effect, the stream metadata extraction module 124 may identify the sound effect (audio data) associated with the neutralizing of the hostile unit, compare the audio data to reference audio data for the neutralizing of the hostile unit, and generate metadata (e.g. a count or value) indicative that one unit of the hostile unit has been neutralized, resulting in the moment script interpreter 123, receiving the metadata, increasing an integer for "number of hostile units neutralized" by "1", to monitor when the condition of the moment (e.g. "number of hostile units neutralized"="50") is met.

The metadata generated through image analysis of the image stream of the snapshot by the processor 171 executing the media stream extraction program code 124 may be transmitted to the moment script interpreter 121.

The stream metadata extraction module 124 may communicate with the overlay controller 123 and/or the moment script interpreter 121 to transmit the metadata generated that can be processed to reflect a state of progress of the snapshot.

The overlay controller 123 can then update the information appearing on the overlay 132 to reflect the progress of the game, based on the metadata generated by the stream metadata extraction module 124. For instance, the score appearing on the overlay can be gradually updated to reflect the user's performance in the snapshot.

For instance, in one moment where the objective is to collect the most amount of resources (e.g. bananas) within five minutes within the particular snapshot, where the game is run from a top-down view, the media stream extraction program code 124 causes the processor to perform image analysis of the frames of the image stream to identify banana image objects appearing in the image. The number of banana objects identified may be transmitted to the moment script interpreter 121 and/or to the overlay controller 123. The image analysis may be performed punctually over the image frames of the image stream. As the bananas are collected by the player, the bananas no longer appear in the image. As such, the media stream extraction program code 124 identifies less banana image objects as the user collects the bananas. The moment script interpreter 121 interprets the metadata received from the media stream extraction program code 124, correlating a decrease in the number of banana image objects with the user collecting one or more bananas. The moment script interpreter 121 then increases an integer for "number of bananas collected" correspondingly with the decrease in the number of banana objects appearing in the image stream, to assess if the user has met the victory condition for the moment to end the moment. The moment script interpreter 121 may communicate the change of the number of bananas collected to the overlay controller 123. The overlay controller 123 may in turn update the value appearing in the overlay 132 corresponding to the number of bananas collected, such that the user can visualize its progress in playing the snapshot. In some examples, the metadata generated by the media stream extraction program code 124 may be transmitted directly to the overlay controller 123 that may directly process the metadata to update information conveyed through the overlay 132 to the user.

In some embodiments, the image analysis may target information-rich portions of the image of the streamed snapshot. For instance, certain portions of the image may contain more information on the score, resources collected, the remaining hit points of the player, etc. For instance, this information may be found in the top and/or bottom portion of the image. As such, in some examples, the script for the moment may include instructions for the stream metadata extraction module 124 to perform image analysis only in certain portions of the image where there is more information to generate metadata, and not perform image analysis on other portions of the image where there is no information, or less information, for the purpose of generating metadata. This may reduce processing costs and resource allocation of the server 120.

In some examples, different forms of image analysis may be performed in different portions of the image of the streamed snapshot. For instance, the script of the moment may include information for or instructions to the stream metadata extraction module 124 to cause the processor to perform optical character recognition in portions of the image where the characters or text appears, and perform object recognition throughout the entire image or in the other portions of the image. In some examples, the image may be divided into quadrants associated with different forms of image analysis, or quadrants of information-rich and information-poor portions.

The server 120 then monitors the progress of the moment to determine when to stop the streaming of the snapshot.

For instance, the moment script interpreter 121 may cause the processor 171 to analyze the metadata generated by the media stream extraction module 124 to determine if the stop condition for the moment has been reached in the progress of the videogame. The moment script interpreter 121 causes the processor 171 to analyze the metadata to determine if a stop condition has been reached, the stop condition included as data in the moments script data 111 for the given moment. For instance, the stop condition may be that the user has reached a given score, that the user's character has lost all of its hit points, that a specific hostile unit in the videogame has been neutralized, that a given play time has been reached, that a certain amount of a resource has been collected, etc. If the stop condition is met through the comparison performed by the processor 171 executing, the program code for the moment script interpreter 121, the moment script interpreter 121 generates a command to the stream controller 122 to stop the streaming of the snapshot for the moment.

The stream controller 122 receives the stop command and transmits a stop stream command 141 to the emulator.

The emulator, receiving the stop command, terminates the emulation, stopping the generating and transmission of the stream of the snapshot of the videogame to the computing device 200, through the server 120.

In some examples, the overlay controller 123 may also receive data from the moment script interpreter 121 that a condition to end the moment has been reached. The overlay controller 123 may then update the overlay 132 to provide an indicator to the user that the moment has come to an end, such as one of the following string of characters "YOU WIN", "YOU LOSE" "YOU DIED", etc.

Once the end condition of the moment has been met, the website or the game catalogue application program running on the computing device 200 may generate the graphical user interface providing the selection of moments of different videogames, allowing the user to select a new moment for playing.

Once the new moment of the videogame has been selected, the method of FIG. 3 may be repeated for that new moment.

In some embodiments, the emulator may be run through a separate server than server 120 (e.g. streaming server 140), where the server 120 communicates with the server (e.g. the streaming server 140) of the emulator. In some examples, the emulator may run on server 120.

Figure 4:
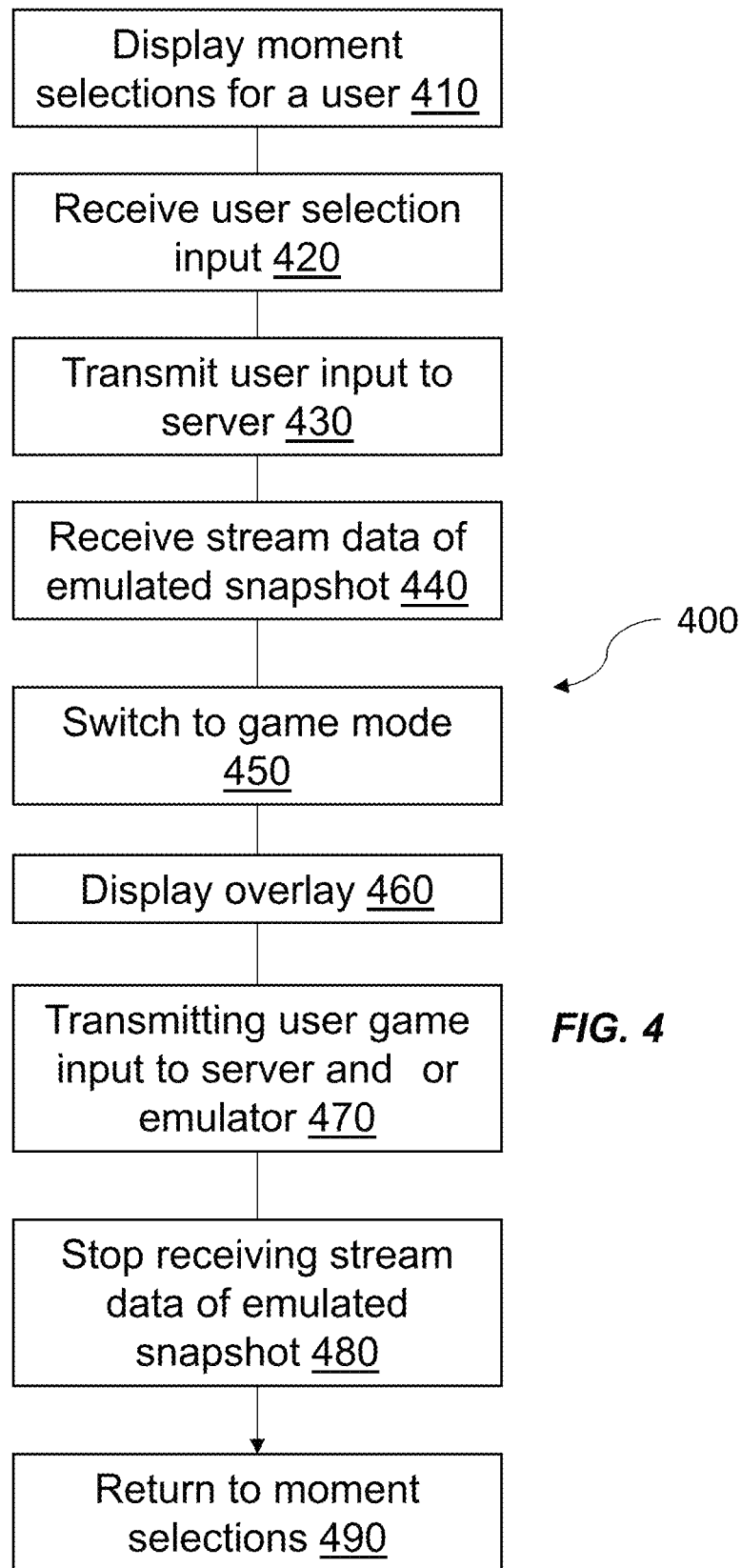
FIG. 4 is a flowchart diagram of an exemplary set of steps carried out by processor executing the program code of an exemplary moment catalogue application program stored in memory of an exemplary computing device.

Exemplary Moment Catalogue Application Program Generating a Moment Selection Graphical User Interface on the Computing Device of the User:

Reference is now made to FIG. 4, illustrating an exemplary set of steps 400 carried out by a processor 201 of a computing device 200 when executing the program code of an exemplary moment catalogue application program stored in memory 202 of the computing device 200.

The moment catalogue application program is for providing the user with a selection of moments of games to browse through, resulting in a catalogue of game moments. As explained herein, each moment is associated with snapshot data of a videogame. Upon the user selecting a moment, the moment catalogue application program acts as a flow-through to allow the user to play the snapshot of the game on the computing device associated with the selected moment, the snapshot data streamed to the moment catalogue application program of the computing device 200.

In some examples, the equivalent functionality of the moment catalogue application program can be obtained by a user through a web site instead of the moment catalogue application program being stored in the memory 202 of the computing device 200.

The moment catalogue application program causes the processor 201 to generate a graphical user interface 210 that displays a selection of moment options to the user at step 410 that the user can browse through, where each moment is associated with a given game, a point in the game and a particular end condition. The description of the moment may be available to the user through the graphical user interface in order to assist the user with selecting a moment. A thumbnail and/or a thumbnail of the moment may be associated with each moment and presented in the graphical user interface.

The user selects a moment using the user input interface 205, the user input transmitted by the processor 201 to the moment catalogue application program at step 420.

The moment catalogue application program causes the processor 201 to transmit the user selection input of the moment to the server 120 at step 430.

The moment catalogue application program causes the processor 201 to receive data associated with the beginning of the streaming of the snapshot corresponding to the selected moment at step 440, transmitted by the server 120 or the streaming server 140 of the emulator.

Once the moment catalogue application program receives the stream data, the graphical user interface of the moment catalogue application program appearing on the display of the computing device 200 transitions to an image of the streamed snapshot of the running game (e.g. can transition through a loading screen) at 450. Audio and other input associated with the running of the game may also be shared with the user through the computing device, the data transmitted to the computing device 200 such that it can be processed by the moment catalogue application program receiving the streamed data.

The moment catalogue application program may also receive an overlay 132 from the server 120 (i.e. the overlay controller 123). The overlay 132 may be added by the moment catalogue application program to the image of the snapshot generated on the display of the computing device, at step 460 providing the user with additional information associated with the selected moment as described herein. The information appearing on the overlay may be updated as the user plays the snapshot, the updated information communicated by the overlay controller to the moment catalogue application program.

As the user provides input on the computing device 200 associated with the playing of the game, where the input is to cause actions to occur within the game space of the snapshot, the user input is relayed from the computing device 200 to the streaming server 140 of the emulator (e.g. to the streaming server 140 directly, or via the server 120 to the streaming server 140), such that the emulator can process the input and generate the corresponding actions in-game.

The moment catalogue application program may stop receiving stream data of the snapshot from the streaming server 140 of the emulator at step 480 when the emulator receives instructions to stop running, indicative that the moment has ended (i.e. an end condition of the moment has been reached). The moment catalogue application program may also receive updated information to be displayed on the overlay to inform the user that the moment has ended.

The moment catalogue application program may then cause the processor 201 to transition back to the graphical user interface presenting a selection of moment options to the user at step 490, allowing the user to select a new moment to play.

Figure 6A:
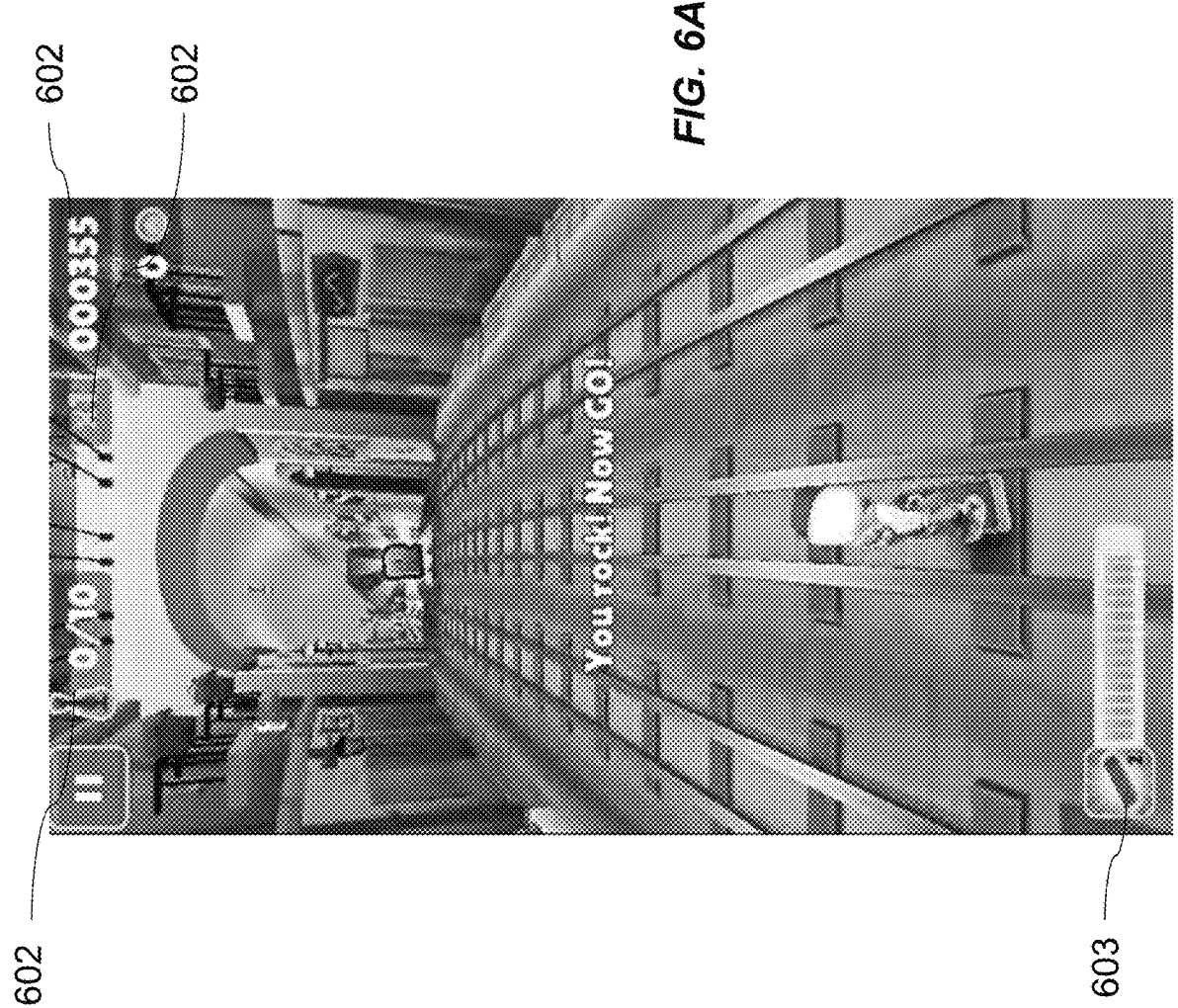
FIG. 6A is a screen capture of an exemplary image of a streamed snapshot of a videogame.
Figure 6B:
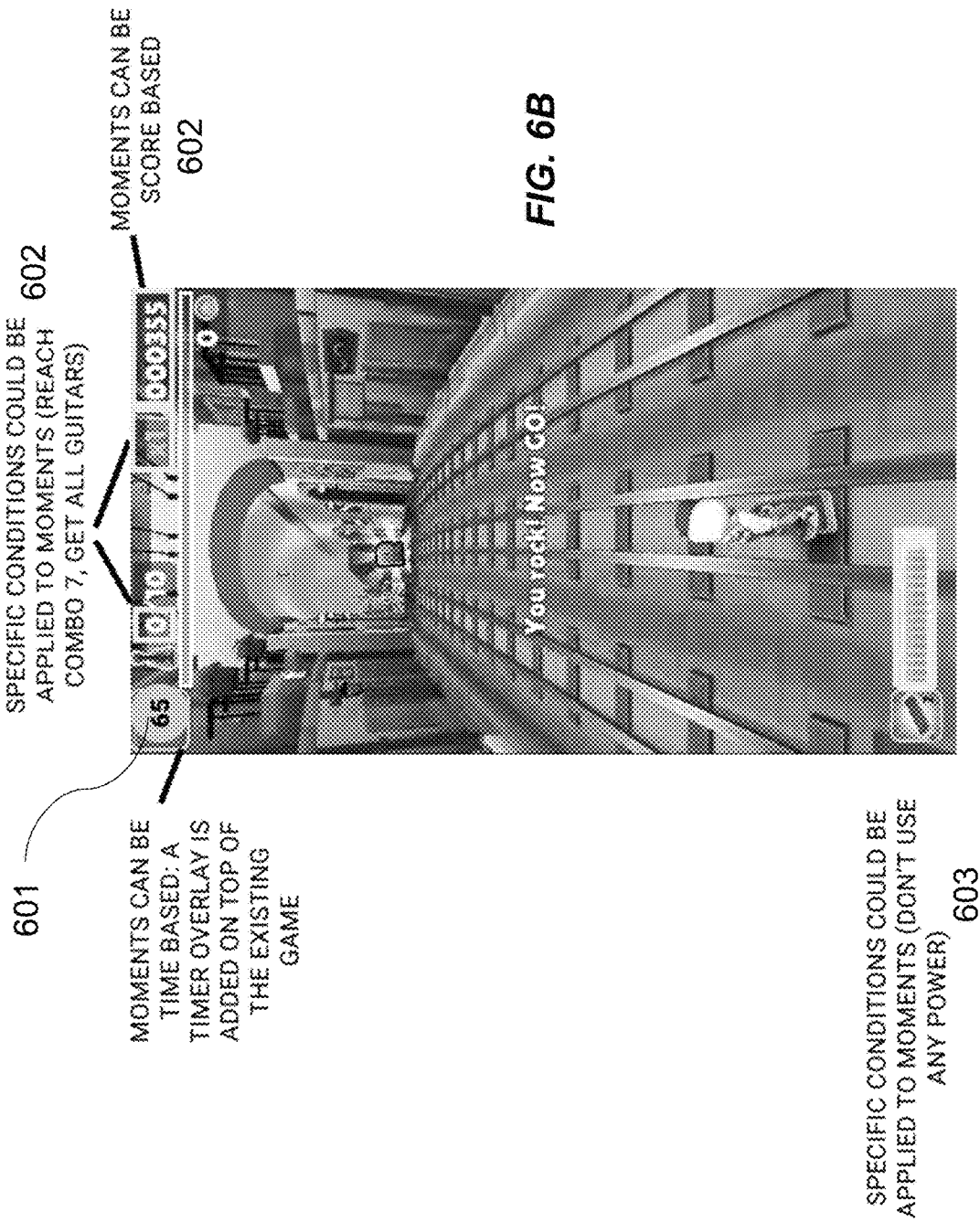
FIG. 6B is a screen capture of an exemplary image of a streamed snapshot of a videogame with an overlay.

Exemplary Overlay 132 For a Snapshot of a Videogame:

Reference is now made to FIGS. 6A and 6B, illustrating exemplary screen captures of exemplary images of a snapshot of a videogame appearing on a display of a computing device 200 when a user is completing a selected moment.

FIG. 6A shows an image of the snapshot of the videogame without an overlay. FIG. 6B shows an image of the snapshot of the videogame with an overlay, and including identification of image objects or information 602 and 603 that may be used for metadata generation by the metadata extraction module 124.

In FIG. 6A, the player is shown riding a skateboard across a railroad track. The image shows in its bottom left corner a bar for the amount of power left for the player. The top of the image shows a number of items collected and a score (top-right corner).

In FIG. 6B, the overlay 132 has added a timer user interface component 601 to the top-left corner. The user is then provided with the timer information, where the timer may be started or stopped by the overlay controller 123 through an API for interfacing with the overlay 132. The timer may also be updated locally to show the time appearing in the timer.

The image analysis of the image stream may be dependent upon the conditions of the moment script of the selected moment. For instance, with respect to the moment associated with the screen capture of FIG. 6B, the conditions for the moment may be, for instance, to pick up all of the guitar resources, to reach a specific combo multiplier, to reach a certain score, etc. The moment script may also specify that the user may not use power during the moment, where the moment script may set a condition to end the moment if it is ever detected that power is used when the player is in the snapshot completing the moment. As such, image analysis of the image stream of the snapshot of the game may be performed to, e.g., identify through optical character recognition the number of guitars collected, the combo multiplier reached and/or the score reached. Image analysis of the image stream of the snapshot of the game may be performed to, e.g., identify through image object recognition and analysis if the object associated with the power bar ever varies, indicative that the user is using power to complete the game. Metadata is generated through the image analysis and transmitted to the moment script interpreter 121.

Upon the moment script interpreter 121 verifying that one of the moment end conditions is met by analyzing the metadata generated through image analysis (e.g. combo multiplier reached, total guitars collected, score reached or power used), the moment script interpreter 121 sends a command to end the streaming of the snapshot to the emulator, ending the moment.

Exemplary System for Generating and Running a Moment Playlist:

In some examples, due to the shorter time to complete a moment when compared to a full videogame, there would be an advantage in allowing a user to play through a series of moments arranged as a playlist for a longer and seamless gameplay, where the completion of one moment by the user would cause the initiation of a subsequent moment, for the user to play with little or no interruption between moments. As a result, the user, as well as any other spectator or playing gamer associated with the user, can transition fluidly from one moment to the next without having to regularly take time to search and identify the next moment to play.

The present disclosure relates to a playlist of videogame moments, where the user can transition from one videogame moment to the next in accordance with the moment playlist as described herein.

In some examples, the system may have stored in memory 172 one or more moment playlist data structures, where a moment playlist data structure includes identifiers of a plurality of moments or moment scripts, and optionally, an order for the moments or moment scripts. When a user selects a moment from the graphical user interface 210 generated by the, e.g., moment catalogue application program, the processor 171 is caused by program code stored in memory 172 to query the moment playlist data structures stored in memory 172 to identify which moment playlist data structure(s) includes an identifier for the selected moment or run moment script. The processor 171 is then caused to retrieve or identified the moment playlist data structure(s) stored in memory 172, and optionally select one (if there is more than one) retrieved or identified moment playlist data structure(s).

When the user completes a moment by having completed an end condition per the moment script data 111, the processor 171 is then caused to analyze the selected moment playlist data structure to determine which moment is next to run. In some examples where the moment playlist data structure includes information on an order of moments or moment scripts, the processor 171 causes the retrieval from memory 172 and the running of the next moment script 111 in accordance with the order provided in the moment playlist data structure. In other embodiments, where the moment playlist data structure does not provide any order, the processor 171 may instead be caused to retrieve moment script data of a moment that has not yet been completed by the user (may be random), per the moment playlist data structure. For instance, the moment playlist may be altered to indicate that a moment has been completed—e.g. altering a value—"0" to "1", or a character "N" to "C", of a field, associated with a moment identifier or moment script identifier, when a moment has been completed by the user. The processor 171 may be caused to parse the character(s) of the field for each moment identifier or moment script identifier to identify that or those that has/have not been completed, may select one randomly or select the next moment in the list that has not been completed, following the moment that has just been completed. As such, the moment selection 131 is performed in accordance with the moment playlist data structure. User input may not be necessary to choose the next moment, as the next moment has been selected 131 in accordance with the moment playlist data structure.

In other embodiments, the graphical user interface 210 of the moment catalogue application program may instead display to the user on the display 204 a selection of playlists that a user may select from, where each playlist is associated with a moment playlist data structure stored in memory 172. The graphical user interface 210 may also share with the user information on the list of moments associated with a given playlist. Upon selection of a playlist by the user, the processor 171 is caused to retrieve from memory 172 the corresponding moment playlist data structure (e.g. by parsing metadata of the moment playlist data structure associated with an identifier). The processor 171 is then caused to initiate gameplay by first a moment provided in the moment playlist data structure (e.g. corresponding to a provided order; randomly), retrieving from memory 172 the corresponding moment script data 111.

In some examples, a user may generate its own playlist of moments. The user may select a plurality of moments using the graphical user interface 210 generated by the moment catalogue application program, and may optionally assign an order to the list of moments. In one example, upon the user providing a "submit" or "save" input on the graphical user interface 210 using user input interface 205, the generated playlist by the user may be stored as a corresponding moment playlist data structure in memory 172. When the user provides input to initiate gameplay of the moment playlist, the moment script data 111 of one moment of the playlist (e.g. the first moment of the playlist) may be selected to run, the moment script interpreter 121 interpreting the moment as described herein.

Once the user has completed a moment of a moment playlist data structure, instead of returning the user to a menu provided on the graphical user interface of moments for the user to select, interrupting the gameplay, the processor 171 is instead caused to analyze the corresponding moment playlist data structure to identify a next moment identified in the moment playlist data structure, retrieving the moment script data 111 associated with the next selected moment 131. This transition between the moments of a moment playlist data structure results in smooth uninterrupted gameplay for the user, as the user transitions between moments in accordance with the moment playlist data structure.

In some embodiments, the system may allow for a group of related users (e.g. "friends") to perform the completion of a moment. This association may be done through user accounts. In these examples, one user may play the moment-implemented snapshot while the other users spectate. In other examples, multiple users may play the moment simultaneously, where, e.g., the group of users may determine which user can complete the moment first. In these examples, when the selection and execution of moments is carried out in accordance with a moment playlist data structure, each of the users may experience transitions between moments in accordance with the moment playlist data structures. For users that are paying the moment, the snapshot of the next moment based on the moment playlist data structure may be streamed on the devices of each user such that each user can play the same moment as their user friends, in accordance with the moment playlist data structure. When the user is a spectator, the spectator user may instead receive a video stream of one or more of the other users of the group that are playing the moment.

Although the invention has been described with reference to preferred embodiments, it is to be understood that modifications may be resorted to as will be apparent to those skilled in the art. Such modifications and variations are to be considered within the purview and scope of the present invention.

Representative, non-limiting examples of the present invention were described above in detail with reference to the attached drawing. This detailed description is merely intended to teach a person of skill in the art further details for practicing preferred aspects of the present teachings and is not intended to limit the scope of the invention. Furthermore, each of the additional features and teachings disclosed above and below may be utilized separately or in conjunction with other features and teachings.

Moreover, combinations of features and steps disclosed in the above detailed description, as well as in the experimental examples, may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

What is claimed is:

1. A computing device for implementing a moment of a videogame for playing a portion of a videogame, comprising:
   memory to store data and instructions;
   a processor in communication with the memory;
   instructions stored in memory that, when executed by the processor, cause the processor to:
   receive user selection input from a computer of the user of a moment of a particular videogame associated with starting at a particular progress point of the particular videogame other than a beginning of the particular videogame, the moment associated with one or more end conditions for stopping a playing of the particular videogame;
   cause an emulation to start of the particular videogame for streaming on the computer of the user, the stream including an image stream of the particular videogame, starting at the particular progress point corresponding to the selected game moment;
   perform image analysis of the image stream for display on a display of the computer of the user to generate metadata on progress of the particular videogame by the user;
   determine if the one or more end conditions is met through analysis of the metadata on the progress of the particular videogame generated through image analysis; and
   cause the emulation to end, resulting in an end of the streaming of the particular videogame on the computer of the user, if the one or more end conditions is met.

2. The computing device in accordance with claim 1, wherein the image analysis may include object recognition to identify image objects in the image stream.

3. The computing device in accordance with claim 2, wherein the object recognition may be to identify at least one of hostile unit image objects and resource image objects appearing in the image stream.

4. The computing device in accordance with claim 1, wherein the image analysis may include optical character recognition to identify characters appearing in the image stream.

5. The computing device in accordance with claim 4, wherein the optical character recognition may identify at least one of a score and a timer included in image frames of the image stream.

6. The computing device in accordance with claim 1, further comprising instructions stored in memory that, when executed by the processor, cause the processor to generate an overlay for transmission to the computer of the user, wherein the overlay is added onto an image of the streamed particular game appearing on a display of the computer of the user, the overlay adding information, associated with the selected moment, to the image absent from the image stream corresponding to the stream of the particular game.

7. The computing device in accordance with claim 6, further comprising instructions stored in memory that, when executed by the processor, cause the processor to update the information added by the overlay as the user progresses through the game, wherein the updating of the information is performed based on the analyzed metadata on the progress of the particular game generated through image analysis.

8. The computing device in accordance with claim 1, wherein at least one of the one or more end conditions of the selected moment may be different from an end condition of the particular game.

9. The computing device in accordance with claim 1, wherein the image analysis may be performed in accordance with instructions provided by a script generated for the selected game moment, the instructions affecting a type of metadata generated through the image analysis.

10. The computing device in accordance with claim 1, further comprising instructions stored in memory that, when executed by the processor, cause the processor to divide an image into information-rich and information-poor portions, wherein the image analysis of the image stream is performed in the information-rich portions of a graphical user interface on the display.

11. A computing device for implementing a moment of a videogame for playing a portion of the videogame starting at a particular starting point, the moment associated with snapshot data for starting to stream the videogame at a particular progress point, comprising:
   memory to store data and instructions;
   a processor in communication with the memory;
   instructions stored in memory that, when executed by the processor, cause the processor to:
      receive user selection input from a computer of the user of a moment of a videogame associated with starting at the particular progress point of the videogame other than a beginning of the videogame;
      generate a script for the selected moment defining one or more end conditions for stopping a playing of the videogame;
      retrieve snapshot data of the videogame corresponding to the selected moment, the snapshot data including information for starting a stream of the videogame at the particular progress point;
      cause a start of an emulation to stream the snapshot data to the computer of the user for enabling gameplay of the videogame at the particular progress point on the computer of the user;
      monitor progress of the gameplay by the user to determine if one of the one or more end conditions defined by the script has been reached; and
      cause an end of the emulation when the one of the one or more end conditions has been met.

12. The computing device in accordance with claim 11, wherein at least one of the one or more end conditions may be different from the end conditions of the videogame.

13. The computing device in accordance with claim 11, wherein the one or more end conditions of the script may define a win condition and a loss condition, wherein the win condition may be different from a win condition of the videogame.

14. The computing device in accordance with claim 11, wherein the monitoring the progress of gameplay may be performed through image analysis of an image stream of the stream of the snapshot data.

15. The computing device in accordance with claim 14, wherein metadata may be generated from the image analysis for determining the progress of gameplay, and wherein the determining if the one or more end conditions of the script is met may be by analyzing the generated metadata to determine if the one or more end conditions of the script is met.

16. The computing device in accordance with claim 15, wherein the generated metadata may include one or more values attributable to image objects or characters appearing in the image stream, and wherein at least one of the one or more end conditions may include a value that is compared with the one or more values included in the generated metadata to determine if the at least one of the one or more end conditions is met.

17. The computing device in accordance with claim 11, wherein the one or more end conditions may include one or more of:
   a lose condition when the life total of a player of the user reaches 0;
   a win condition when a timer clocks down to 0;
   a lose condition when a time clocks down to 0; and
   a win condition when a hostile unit appearing the snapshot is defeated.

18. The computing device in accordance with claim 11, wherein more than one moment selectable by the user may be associated with the snapshot data, and wherein a different script may be generated for each of the more than one moment, and wherein each script may have at least one different end condition.

19. The computing device in accordance with claim 11, further comprising instructions stored in memory that, when executed by the processor, cause the processor to generate an overlay for transmission to the computer of the user, wherein the overlay is added onto an image of the streamed snapshot data appearing on a display of the computer of the user, the overlay adding information for the user indicative of how close the user is to meeting at least one of the one or more end conditions of the script.

20. The computing device in accordance with claim 11, further comprising instructions stored in memory that, when executed by the processor, cause the processor to display a message through the overlay indicative of one of the one or more end conditions of the script being met when the one of the one or more conditions is met.

* * * * *